US012238161B2

United States Patent
Sun et al.

(10) Patent No.: US 12,238,161 B2
(45) Date of Patent: Feb. 25, 2025

(54) SYSTEM FOR TRACING HARMONIC SOURCES BASED ON CLOUD-EDGE-TERMINAL COLLABORATION AND METHOD THEREOF

(71) Applicant: SHANDONG UNIVERSITY, Shandong (CN)

(72) Inventors: Yuanyuan Sun, Shandong (CN); Lei Ding, Shandong (CN); Qingshen Xu, Shandong (CN); Yahui Li, Shandong (CN); Quanrui Hao, Shandong (CN); Kaiqi Sun, Shandong (CN); Shulin Yin, Shandong (CN); Bowen Li, Shandong (CN); Ruize Sun, Shandong (CN); Pengbo Shan, Shandong (CN); Demin Qi, Shandong (CN); Qianqian Li, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 0 days.

(21) Appl. No.: 18/817,356

(22) Filed: Aug. 28, 2024

(65) Prior Publication Data
US 2024/0422213 A1 Dec. 19, 2024

Related U.S. Application Data

(63) Continuation of application No. PCT/CN2022/137579, filed on Dec. 8, 2022.

(30) Foreign Application Priority Data

Aug. 16, 2022 (CN) .......................... 202210979469.9

(51) Int. Cl.
*H04L 67/10* (2022.01)

(52) U.S. Cl.
CPC .................................. *H04L 67/10* (2013.01)

(58) Field of Classification Search
CPC ....................................................... H04L 67/10
(Continued)

(56) References Cited

U.S. PATENT DOCUMENTS

| 2012/0081824 | A1* | 4/2012 | Narendra | ................. | H02H 3/46 |
| | | | | | 324/157 |
| 2016/0179120 | A1* | 6/2016 | Boardman | ............... | H02J 3/26 |
| | | | | | 700/295 |
| 2019/0087231 | A1 | 3/2019 | Huh et al. | | |

FOREIGN PATENT DOCUMENTS

| CN | 109239456 A | 1/2019 |
| CN | 109342815 A | 2/2019 |

(Continued)

OTHER PUBLICATIONS

PCT/CN2022/137579 ISA210 Search Report Mail Date Apr. 17, 2023.

*Primary Examiner* — Michael J Brown
(74) *Attorney, Agent, or Firm* — IPRO, PLLC

(57) ABSTRACT

The invention belongs to the technical field of harmonic contribution evaluation, and particularly relates to a system for tracing harmonic sources based on a cloud-edge-terminal collaboration and a method thereof, comprising: terminal module, collecting and transmitting real-time harmonic data to edge module; edge module, comprising plurality of edge computing servers deployed for the transformer substations and the transformer districts by units, realizing hierarchical control between edge computing servers according to voltage levels, and transmitting harmonic sources tracing task through hierarchical interactions between the edge computing servers; the edge computing server receiving harmonic sources tracing service request performs the tracing task, and feeds tracing result back to central module; and, central (Continued)

module, comprising cloud server receiving harmonic sources tracing service request initiated by user, determining edge computing server offloaded by the request, storing final tracing result from entire the system, and matching typical harmonic source according to disturbance source information.

14 Claims, 5 Drawing Sheets

(58) Field of Classification Search
USPC ........................................................ 700/295
See application file for complete search history.

(56) References Cited

FOREIGN PATENT DOCUMENTS

| CN | 110618314 A | 12/2019 |
|---|---|---|
| CN | 110618316 A | 12/2019 |
| CN | 111045828 A | 4/2020 |
| CN | 111934325 A | 11/2020 |
| CN | 114034928 A | 2/2022 |
| CN | 115051477 A | 9/2022 |

* cited by examiner

SYSTEM FOR TRACING HARMONIC SOURCES BASED ON CLOUD-EDGE-TERMINAL COLLABORATION AND METHOD THEREOF

The present invention claims priority benefits to Chinese Patent Application number 202210979469. 9, entitled "a system for tracing harmonic sources based on a cloud-edge-terminal collaboration and a method thereof", filed on Aug. 16, 2022, with the China National Intellectual Property Administration (CNIPA), the entire contents of which are incorporated herein by reference.

TECHNICAL FIELD

The invention belongs to the technical field of harmonic contribution evaluation, and particularly relates to a system for tracing harmonic sources based on a cloud-edge-terminal collaboration and a method thereof.

BACKGROUND

The statements in this section merely provide background information related to the present invention and are not necessarily prior art.

At present, a large number of sensors and intelligent terminals are deployed on the power distribution grid, which can effectively improve the perception ability of the power quality of distributed source, load and storage equipment. Based on the effective integration of power Internet of Things and 5G technology, the cloud-edge-terminal collaboration of multi-level resources provides an effective way for hierarchical monitoring of harmonics in the power grid. Therefore, it is necessary to carry out a location and contribution evaluation of harmonic disturbance sources based on cloud-edge-terminal collaboration technology, which provides basis for the implementation of economic reward and punishment measures and effective harmonic control.

According to the inventor, there has been some research on harmonic contribution evaluation of power distribution network at present. In order to evaluate harmonic contribution of point of common coupling (PCC), the power system equivalent model centered on the PCC is usually divided into a system side and a user side, and to compare the contribution of both sides to PCC voltage/current distortion. The existing methods lack in combining with cloud-edge-terminal collaboration technology, and it is difficult to field application of the traditional harmonic contribution evaluation scheme.

SUMMARY

In order to solve the above problems, the present application provides a system for tracing harmonic sources based on cloud-edge-terminal collaboration and a method thereof, which for radial distribution networks, harmonic measurement terminals are deployed in transformer substations and distribution equipment and distribution network lines of transformer districts, edge computing servers are deployed in the transformer substations and the transformer districts as units, each the edge computing server is controlled downward step by step according to voltage grade, and cloud servers of the system for tracing harmonic sources are deployed in centralized equipment rooms such as data centers; implementing corresponding service schemes according to the voltage level and operating conditions of the power grid, and completing the tracing of the harmonic sources near the terminals through a hierarchical interaction of edge computing environment, as to realize the location and contribution evaluation of the harmonic sources based on cloud-edge-terminal collaboration.

According to some embodiments, the first aspect of the present application provides a system for tracing harmonic sources based on cloud-edge-terminal collaboration, which adopts the following technical solution.

A system for tracing harmonic sources based on cloud-edge-terminal collaboration, comprising:
  a terminal module, being configured to collect real-time harmonic data for reflecting an actual operation situation of a power grid and transmit the collected real-time harmonic data to an edge module;
  the edge module, being configured to comprise a plurality of edge computing servers of edge cloud, wherein the plurality of edge computing servers are deployed for transformer substations and transformer districts by units, realize a hierarchical control between the plurality of the edge computing servers according to voltage levels, and transmit a tracing task of harmonic sources through hierarchical interactions between the plurality of the edge computing servers; wherein, one of the plurality of the edge computing servers receiving a request of tracing service of harmonic sources performs the tracing task of harmonic sources, and feeds a tracing result of harmonic sources back to a central module; and
  the central module, being configured to comprise a cloud server for controlling the system for tracing harmonic sources, wherein the cloud server receives the request of tracing service of harmonic sources initiated by a user, determines one of the plurality of the edge computing servers offloaded by the request of tracing service of harmonic sources, stores a final tracing result from entire the system for tracing harmonic sources, and matches a typical harmonic source according to a disturbance source information.

As a further technical limitation, the terminal module comprises harmonic measurement terminals, and each of the harmonic measurement terminals is arranged at a low-voltage side and a feeder line of distribution transformer of the transformer substations, a low-voltage side and a feeder line of distribution transformer of the transformer districts, and a grid-connected node of a key user of a medium/low-voltage distribution network.

As a further technical limitation, the edge module stores upload data transmitted by the terminal module, checks a harmonic distortion situation in terminals under a jurisdiction thereof simultaneously, observes and marks the terminal of which the harmonic distortion situation exceeds a specified threshold, and initiates a request of local tracing service of harmonic sources through an "terminal marked event"; wherein, when the edge computing server at a higher level receives an upload result from the edge computing server at a lower level, the request of the local tracing service of harmonic sources is initiated based on the upload result, and an execution result of the request is delivered to the edge computing server; and a download task of the central module is offloaded through the edge computing servers, and performance of executing locally or continue offloading to a local edge computing server can be determined by the edge computing server.

As a further technical limitation, the plurality of the edge computing servers comprises centralized edge computing servers and local edge computing servers; wherein, the centralized edge computing servers centrally control entire the edge cloud computing network; and the local edge computing servers are controlled step by step according to the voltage levels, and are responsible for terminal jurisdiction and tracing decisions within a local range.

As a further technical limitation, the central module stores the tracing result of the system for tracing harmonic sources, and matches a harmonic source according to the results from the cloud servers; further, controls all the edge computing servers, when the request of tracing service is initiated, decides one of the edge computing servers which a computing task being offloaded to, and feeds the tracing result of harmonic sources back to the cloud servers and the terminal module.

According to some embodiments, the second aspect of the present application provides a method of tracing harmonic sources based on cloud-edge-terminal collaboration, using the system for tracing harmonic sources based on cloud-edge-terminal collaboration provided in the first aspect, and comprises the following technical solution.

A method of tracing harmonic sources based on cloud-edge-terminal collaboration, comprising:
  acquiring, by harmonic measurement terminals, real-time harmonic data of power grid operation, and uploading the acquired real-time harmonic data to a docking managed edge computing server;
  determining, by docking managed edge computing server, whether to initiate a request of tracing service of harmonic sources locally based on the acquired real-time harmonic data;
  when the request of local tracing service of harmonic sources is initiated by the docking managed edge computing server, performing a corresponding tracing task of harmonic sources according to different over-criterion situations of harmonics, transmitting the corresponding tracing task of harmonic sources through hierarchical interactions between edge computing servers, and finally feeding a tracing result of harmonic sources back to a cloud server, to complete the tracing of harmonic sources based on the cloud-edge-terminal collaboration; and
  when the cloud server receiving the request of local tracing service of harmonic sources is initiated by a user of the system, determining one edge computing server unloaded by the request of tracing service of harmonic sources; executing, by the edge computing server receiving the request of tracing service of harmonic sources, the tracing task of harmonic sources, feeding the tracing result of harmonic sources back to the cloud server, to complete the tracing of harmonic sources based on the cloud-edge-terminal collaboration.

As a further technical limitation, in the process of the determining, by the edge computing server, whether to initiate the request of tracing service of harmonic sources locally based on the acquired real-time harmonic data, when there is an over-criterion harmonic appears in a single terminal, the edge computing server initiates an observation request, marks the terminal the over-criterion harmonic appears, and observes an over-criterion situation of harmonic of the marked terminal within a specified time period; wherein, if a proportion of duration during which the voltage distortion rate of the marked terminal in the observation time period exceeds a prescribed threshold value, the edge computing server initiates the request of local tracing service of harmonic sources, otherwise, the mark of the marked terminal is cancelled; all tracing tasks of the system are executed based on the calculation of the harmonic measurement data in the observation time period.

Further, in the process of the initiating, by the edge computing server, the request of local tracing service of harmonic sources to perform the corresponding tracing task of harmonic sources according to different over-criterion situations of harmonics, when the edge computing server at the higher level receives the upload result from the edge computing server at the lower level, the edge computing server initiates the request of local tracing service of harmonic sources based on the upload result; and, based on the download task of the central module is offloaded through the edge computing servers, and the edge computing server determines whether to execute the request of tracing service of harmonic sources locally or to continue offloading the download task to the local edge computing servers.

As a further technical limitation, the method for tracing harmonic sources comprises an evaluation of area harmonic contributions, comprising: taking a monitoring point of the harmonic contributions to be divided as a starting point, dividing each sub-area layer by layer through a distribution structure of the harmonic measurement terminals in the distribution lines wherein those harmonic measurement terminals are located, and gradually refining the harmonic contributions through the hierarchical relationship of the edge computing servers.

According to some embodiments, the third aspect of the present application provides a computer-readable storage medium, adopting the following technical solution.

A non-transitory computer readable storage medium, having a program stored thereon, wherein when the program executed by a processor, steps of a method of tracing harmonic sources based on cloud-edge-terminal collaboration according to the second aspect of the present application are implemented.

According to some embodiments, the fourth aspect of the present application provides an electronic device, adopting the following technical solution.

An electronic device, comprising a memory, a processor, and a program stored in the memory and executable on the processor, wherein when the program executed by the processor, steps of a method of tracing harmonic sources based on cloud-edge-terminal collaboration according to the second aspect of the present application are implemented.

Compared with the prior art, the present application has the following beneficial effects:

The system for tracing harmonic sources provided in the present application, closely combines the measurement situation of an actual project with the tracing requirement of harmonic sources of a power distribution network, sets matching tracing schemes at different voltage levels, initiates contribution evaluation requirements at the edge side, completes the tracing of the harmonic sources nearby, generates faster contribution evaluation response, and greatly reduces the workload of cloud calling data and assessment calculation; sets a starting criterion for hierarchical interaction of harmonic contribution evaluation, and it is quickly determine whether a calculation task is performed locally or uploaded to a higher-level server; which is simple and practical; and, is not limited by the distribution of concerned nodes and measurement terminals, and can assess harmonic contribution for any measurement configuration scheme and assessment requirement of any harmonic times of a radial power distribution network by dividing sub-areas step by step, and has extremely strong adaptability and universality.

According to the present application, locating the area where the dominant disturbance source of the harmonic located in, quantifying harmonic contribution of the system background and each user to the concerned buses/nodes, directly locating the pollution source, providing a basis for subsequent targeted treatment of the dominant disturbance source, and fundamentally solving the disturbance; further can check erroneous ideas at the outset, which is helpful to reduce the occurrence risk and harm of the power quality problem, and improve the high-quality power supply level of the power distribution system. Furthermore, corresponding execution contents may include, but are not limited to: (1) installing active/passive filters; (2) switching static reactive power compensators, such as capacitors; and (3) installing dynamic reactive power compensators, such as a SVG (Static Var Generator), in the area where the dominant disturbance source of the harmonic located in.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

DETAILED DESCRIPTION

The present invention will now be further described with reference to the accompanying drawings and embodiments.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific embodiments, and are not intended to limit exemplary embodiments of the present invention. As used herein, the singular form is also intended to include the plural form unless the context clearly dictates otherwise. In addition, it should further be understood that, terms "include" and/or "including" used in this specification indicate that there are features, steps, operations, devices, components, and/or combinations thereof.

The embodiments and the features of the embodiments in the present invention may be combined with each other without conflict.

Embodiment I

The present embodiment proposes a system for tracing harmonic sources based on cloud-edge-terminal collaboration.

Figure 1:
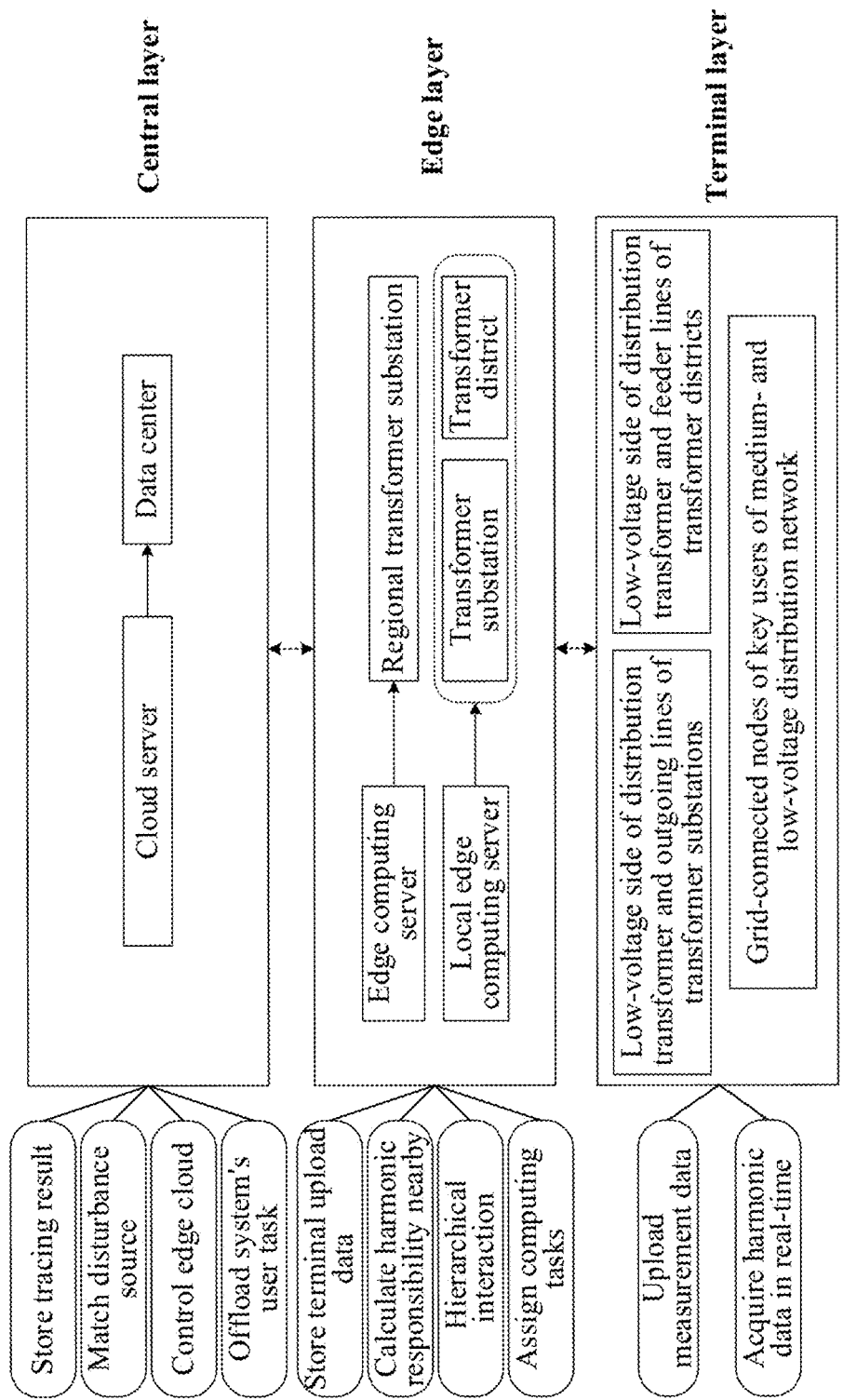
FIG. 1 is a structural block diagram of a system for tracing harmonic sources based on cloud-edge-terminal collaboration according to Embodiment 1 of the present application.

As shown in FIG. 1, the system for tracing harmonic sources based on the cloud-edge-terminal collaboration, including:
a terminal module, being configured to collect real-time harmonic data for reflecting an actual operation situation of a power grid and transmit the collected real-time harmonic data to an edge module;
the edge module, being configured to comprise a plurality of edge computing servers of edge cloud, wherein the plurality of the edge computing servers are deployed for transformer substations and transformer districts by units, realize a hierarchical control between the plurality of the edge computing servers according to voltage levels, and transmit a tracing task of harmonic sources through hierarchical interactions between the plurality of the edge computing servers; wherein, one of the plurality of the edge computing servers receiving a request of tracing service of harmonic sources performs the tracing task of harmonic sources, and feeds a tracing result of harmonic sources back to a central module; and
the central module, being configured to comprise a cloud server for controlling the system for tracing harmonic sources, wherein the cloud server receives the request of tracing service of harmonic sources initiated by a user of the system, determines one of the plurality of the edge computing servers offloaded by the request of tracing service of harmonic sources, stores a final tracing result from entire the system for tracing harmonic sources, and matches a typical harmonic source according to a disturbance source information.

As one or more embodiments, the terminal module consists of harmonic measurement terminals deployed at a low-voltage side and a feeder line of distribution transformer of the transformer substations, a low-voltage side and a feeder line of distribution transformer of the transformer districts, and a grid-connected node of a key user of a medium/low voltage distribution network. Each of the harmonic measurement terminals collects harmonic data in real-time and uploads the harmonic data to the edge module.

The transformer substations include substations, with distribution voltage levels such as 220 kV, 110 kV, and 35 kV, mainly supplying power to regional users, wherein, the substations with a transmission voltage level on a high-voltage side, such as 220 kV or 110 kV, can be called regional substations. The harmonic measurement terminals are mounted at low-voltage side and feeder lines of distribution transformer of the transformer substations to collect harmonic data of low-voltage side bus and each of the feeder lines.

The transformer district refers to the power supply scope of a transformer, and the harmonic measurement terminals are mounted at the low-voltage side and feeder lines of distribution transformer of the transformer districts to collect harmonic data of the bus at the low-voltage side of the distribution transformer and each of the feeder lines.

Key users of medium/low-voltage distribution network, including photovoltaic, wind power, electric vehicle charging station, electric arc furnace, residential load and other typical harmonic disturbance sources connected into low-voltage distribution networks, such as 35 kV, 10 kV, and 380V. The harmonic measurement terminals are mounted at the nodes where the grid-connected harmonic sources are dense and the harmonic disturbance is large, to collect the harmonic data of each grid-connected node of the key users.

The harmonic data includes harmonic distortion rate of phase voltage and phase current of three phases A, B and C, effective value of harmonic voltage and effective value of harmonic current of single phase. The time scale of measuring data shall not exceed 1 minute, i.e., at least obtaining one monitoring value per minute.

As one or more embodiments, the edge module includes the plurality of the edge computing servers of the edge cloud, and the edge computing servers are deployed for transformer substations and transformer districts by units to have jurisdiction over all terminals in the edge cloud. A single edge cloud is formed from the low-voltage side of the regional transformer substation as the start point to the distribution network area of the downstream including low-voltage users. The edge cloud is a hierarchical structure, including centralized edge computing servers and local edge computing servers, wherein the centralized edge computing servers centrally control the entire edge cloud computing network, and the local edge computing servers are controlled step by step according to voltage levels, responsible for terminal jurisdiction and tracing decisions within a local range.

Figure 2:
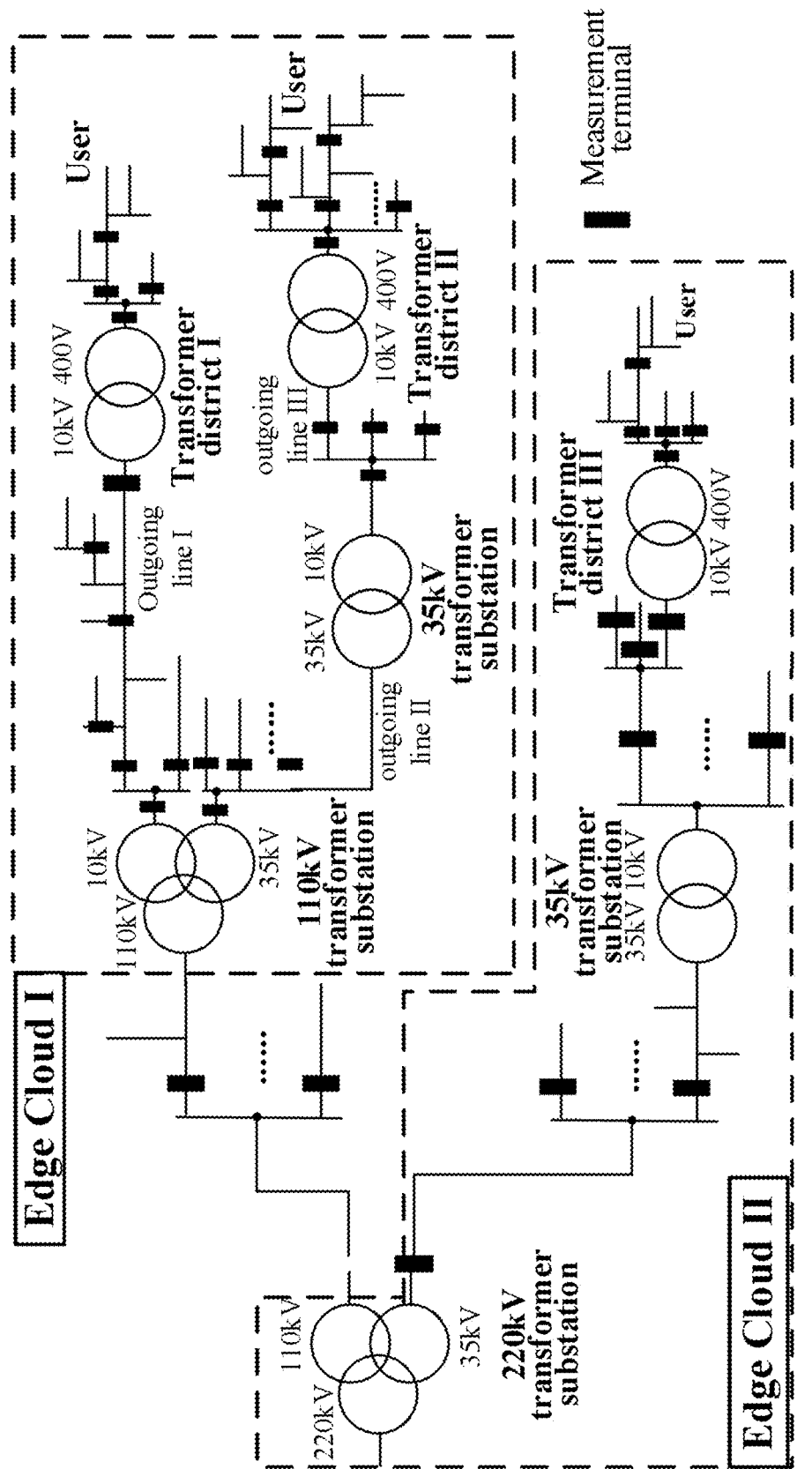
FIG. 2 is a schematic diagram of deployment of edge terminal in a low voltage distribution network according to Embodiment 1 of the present application.
Figure 3:
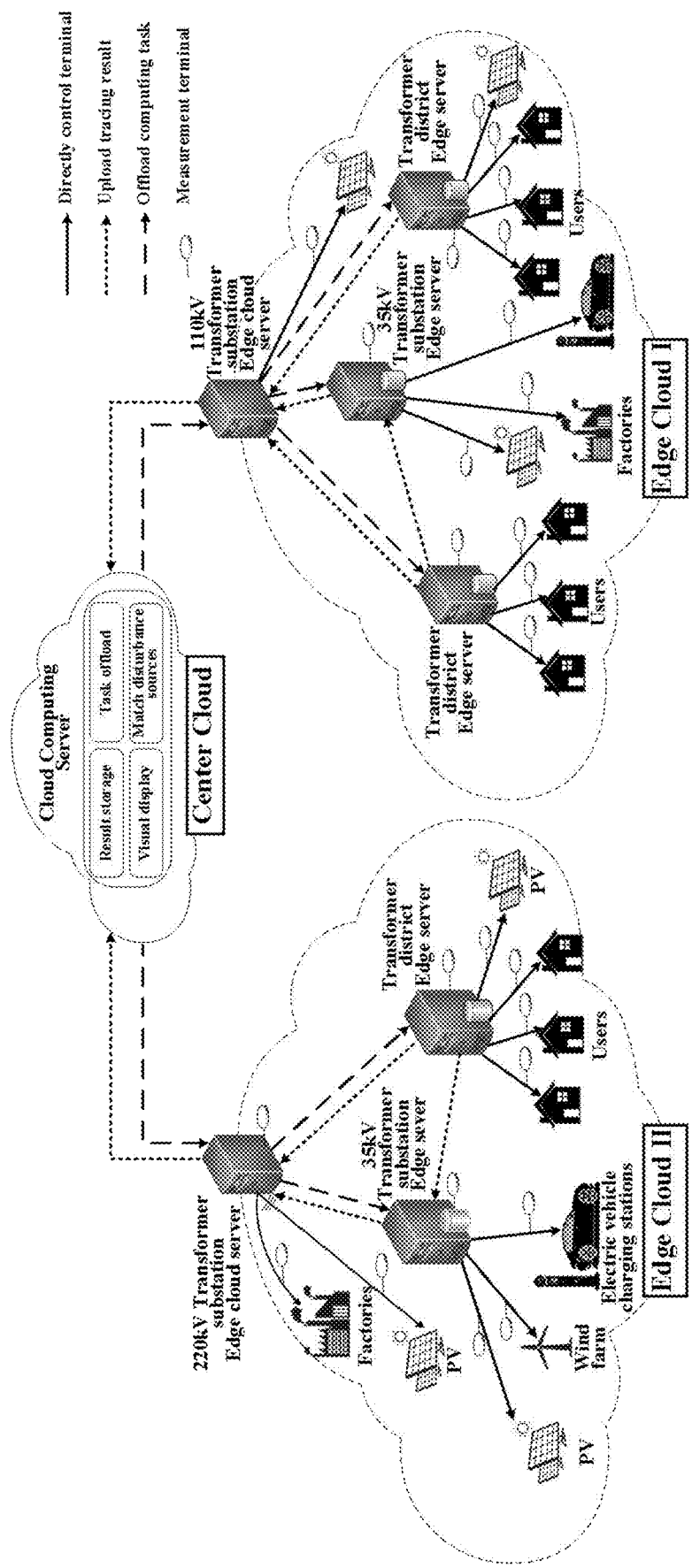
FIG. 3 is a schematic diagram of logic architecture of cloud-edge-terminal collaboration of the system for tracing harmonic sources according to Embodiment 1 of the present application.

In the medium/low-voltage distribution system, as shown in FIG. 2, to establish the system for tracing harmonic sources as shown in FIG. 3. The edge cloud I is formed from the low-voltage side of distribution transformer of the transformer substation with higher voltage to the terminal of the distribution network, the centralized edge computing server is deployed in the transformer substation with higher voltage, to centrally control all local servers in the edge cloud I; the local edge computing servers are deployed in the transformer substation with lower voltage and transformer district at downstream, and a control level of edge computing servers deployed in the transformer substation with lower voltage is higher than that of the edge computing servers deployed in the downstream transformer district.

The services provided by the edge module include:

(1) Storing upload data from a terminal layer. The edge computing server of the transformer substation has jurisdiction over the harmonic measurement terminals deployed on the distribution lines from the low-voltage side of the distribution transformer and the feeder line of the transformer substation to the transformer substation/transformer district of the next voltage level. The edge computing server of the transformer district has jurisdiction over the harmonic measurement terminals deployed at the low-voltage side of the distribution transformer and the feeder line of the transformer district and the grid-connected nodes of the key users at the downstream of the transformer district.

As shown in FIGS. 2 and 3, the harmonic measurement terminals under the jurisdiction of the edge computing server of the edge cloud I, including: the harmonic measurement terminals mounted at two low-voltage sides of the distribution transformer and all feeder lines of the transformer substation with higher voltage and the distribution lines to the transformer substation/transformer district of the next voltage level. Taking the feeder line of low-voltage as an example, the harmonic measurement terminal mounted on the distribution line from low-voltage feeder line I to the distribution transformer of the transformer district I is under the jurisdiction of the edge computing server. The edge computing server of the transformer district I has jurisdiction over the harmonic measurement terminals deployed at the low-voltage side of the distribution transformer and the feeder line of the transformer district I and the grid-connected nodes of the key users at the downstream of the transformer district I.

(2) Checking the harmonic distortion of the terminal under the jurisdiction, and observing and marking the terminal the over-criterion harmonic appears, and initiate a request of local tracing service of harmonic sources through a "terminal marked event". The edge computing server at lower level judges whether the tracing result is the final result, if yes, uploads the result to the edge computing server; otherwise, uploads the result to the edge computing server at higher level. Both the local tracing results of edge computing servers and the upload results received from the lower-level edge computing servers are uploaded to the central layer.

(3) When the higher-level edge computing server receives the upload result from a lower-level edge computing server, the upload result initiates the request of local tracing service of harmonic sources, and delivers the execution result as the final result to the edge computing server.

As shown in FIG. 3, in the edge cloud I, after the request of the local tracing service is performed in the transformer district I, determining whether the result is the final result or not, if yes, uploading the result to the edge computing server, otherwise, uploading the result to the edge computing server of the transformer substation with lower voltage. After receiving the upload result from the transformer district I, the edge computing server of the transformer substation with lower voltage performs the request of the local tracing service, and then uploads the tracing result to the edge computing server. The edge computing servers aggregate and upload the upload results from the lower-level edge computing servers to the cloud server in the central layer.

(4) Download tasks from the central layer are offloaded at, and the edge computing servers decide whether to execute locally or continue offloading to local edge computing servers.

As shown in FIG. 3, if the download task of the center layer is within the service range of the edge cloud I, the task is offloaded to the edge computing server of the edge cloud I, and the edge computing server decides whether to execute it locally or continue to offload it.

As one or more embodiments, the central module including cloud servers, is the control core of the system for tracing harmonic sources, and is deployed in centralized computer rooms such as data centers.

The services provided by the central module include: (1) storing the final tracing results of the whole system for tracing harmonic sources. As shown in FIG. 3, the cloud server stores the final tracing results uploaded by the two edge computing servers, and matches the main harmonic sources according to the disturbance source information; and, (2) controlling all the edge computing servers, and when the user of the system for tracing harmonic sources initiates a tracing request, determining which edge computing server to offload the computing task to, and feeding the execution results back to the user of the system.

Embodiment II

The present embodiment, on the basis of Embodiment 1, proposes a method of tracing harmonic sources based on the cloud-edge-terminal collaboration.

Figure 4:
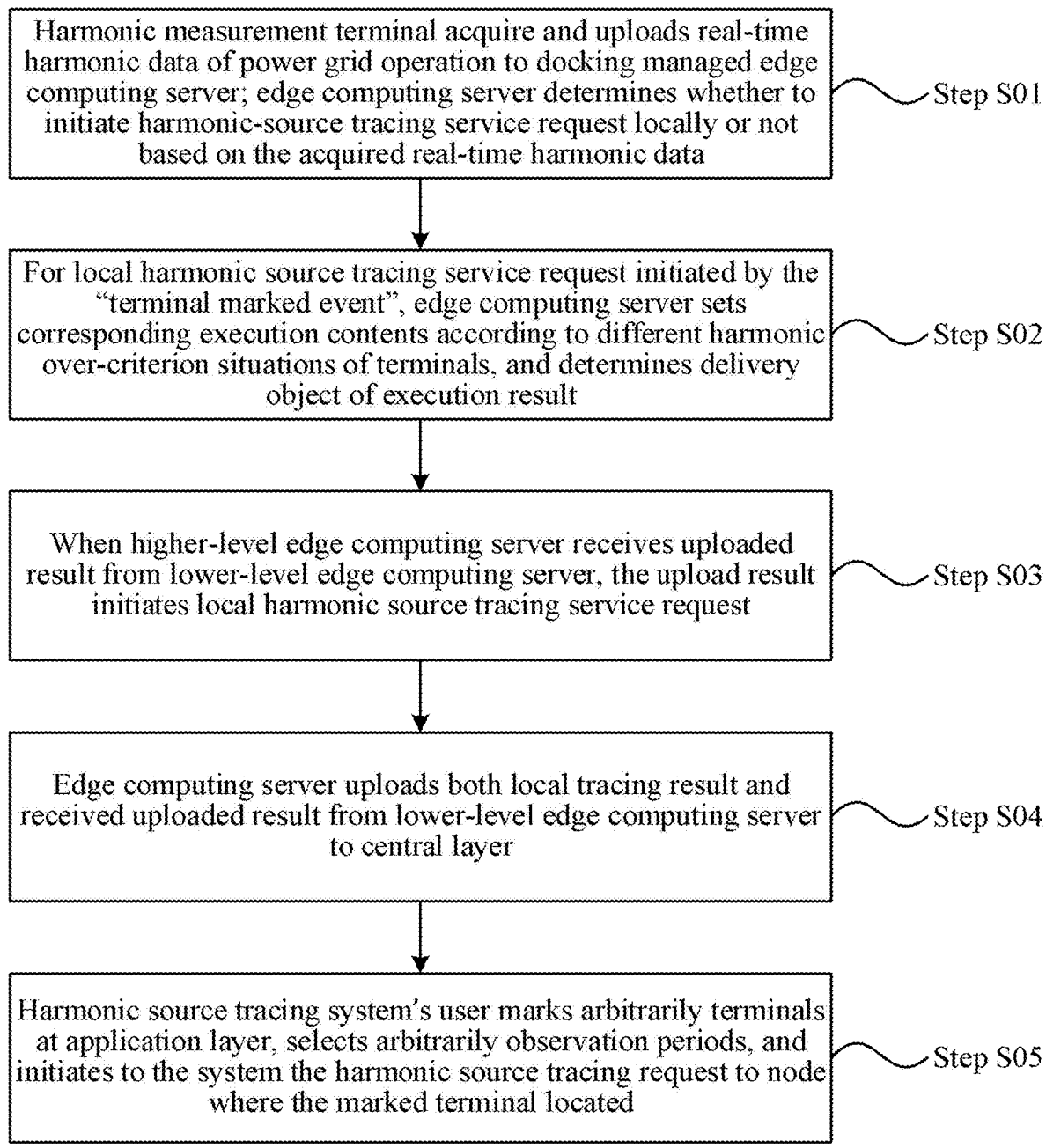
FIG. 4 is a flowchart of a method of tracing harmonic sources based on cloud-edge-terminal collaboration according to Embodiment 2 of the present application.

As shown in FIG. 4, the method of tracing harmonic sources based on the cloud-edge-terminal collaboration, including:

Step S01: acquiring, by harmonic measurement terminals, real-time harmonic data of power grid operation, and uploading the acquired real-time harmonic data to a docking managed edge computing server; determining, by docking managed edge computing server, whether to initiate a request of tracing service of harmonic sources locally based on the acquired real-time harmonic data;

Step S02: for the request of local tracing service of harmonic sources initiated by the "terminal marked event", setting, by the edge computing server, corresponding execution contents according to different over-criterion situations of harmonics of the terminals, and determining a delivery object of the execution result;

Step S03: when the edge computing server at the higher level receives the upload result from the edge computing server at the lower level, initiating, by the upload result, the request of local tracing service of harmonic sources;

Step S04: uploading, by the edge computing server, both the local tracing result and the received upload result from the lower-level edge computing server to the central layer;

Step S05: marking arbitrarily, by the user of the system for tracing harmonic sources, the terminal at an application layer; selecting arbitrarily the observation period; and, initiating, to the system, the request of tracing harmonic sources for the node where the marked terminal is located.

As one or more embodiments, in the step S01, the edge computing server stores the measuring data in a local storage unit, and checks whether the harmonic distortion of each terminal is within the allowable range of the national standard. When the over-criterion harmonic appears in a single terminal, the edge computing server initiates an observation request, marks the terminal that the over-criterion harmonic appears, and observes an over-criterion situation of harmonic of the marked terminal within a specified time period. If a proportion of duration during which the voltage distortion rate of the marked terminal in the observation time period exceeds a prescribed threshold value, the edge computing server initiates the request of local tracing service of harmonic sources; otherwise, the mark of the marked terminal is cancelled. All tracing tasks of the system are executed based on the calculation of the harmonic measurement data in the observation time period.

The checking that whether the harmonic distortion of each terminal is within the allowable range of the national standard, can be carried out by comparing the requirements of the national standard "Power Quality: Harmonics of Public Power Grid" (GB/T 14549-93).

The process of the when the over-criterion harmonic appears in the single terminal, the edge computing server initiates the observation request, marks the terminal that the over-criterion harmonic appears, and observes the over-criterion situation of harmonic of the marked terminal within the specified time period, including:

the edge computing server initiates the observation request, and make a timing while marking the terminal with the over-criterion harmonic, wherein, within the preset time period T (min), a calculation of the prescribed threshold $K_i$ for the duration of the over-criterion shown as the Equation (1) below:

$$K_i = \frac{1}{VTHD_{95^{th}} - k_i} \times 100\% \quad (1)$$

Wherein, i is the voltage level (kV) of the measuring point, $VTHD_{95^{th}}$ is a probability value of 95% of a total harmonic voltage distortion rate of the measuring point, and $k_i$ is the limit value of the total harmonic phase voltage distortion rate under the voltage level i kV in the national standard.

If the proportion of duration during which the voltage distortion rate exceeding the standard in the specified time period T exceeds the prescribed threshold $K_i$, the edge computing server initiates a request of local tracing service of harmonic sources, and enters the step S02; otherwise, the mark of the marked terminal is cancelled.

As one or more embodiments, in the step S02, the process of the edge computing server sets corresponding execution contents according to the different over-criterion situations of harmonic of the terminals, specifically comprising:

(1) If the marked terminal is located inside the distribution transformer, i.e. the over-criterion harmonic appears in the bus at the low-voltage side of the distribution transformer, the implementation contents of the local tracing service of harmonic sources include: (i) if the main harmonic source of the bus is the upstream of the transformer, terminating the local tracing service; if the identification task is executed in the local edge computing server, uploading the identification result to a higher-level edge computing server, and entering the step S03; if the identification task is executed in the edge computing server, uploading the identification result to the cloud server, and entering the step S04; and, (ii) if the main harmonic source of the bus is the downstream of the terminal, firstly, performing a centralized evaluation of the harmonic contribution to the over-criterion bus by using the data measured at the low-voltage side of the distribution transformer and each feeder line, then selecting the feeder line with the largest harmonic contribution and performing a decentralized evaluate of area harmonic contribution by using the measurement data of the grid-connected nodes of the key users on the present feeder line, and then terminating the local tracing service and uploading the result to the edge computing server.

As shown in FIG. 2, when the over-criterion harmonic appears in the bus at the low-voltage side of the distribution transformer of the transformer substation with lower voltage in the edge cloud I, if the identified main harmonic source is at the upstream of the terminal, terminating the local tracing service and uploading the result to the edge computing server; if the identified main harmonic source at the downstream of the terminal, firstly, performing the centralized evaluation of the harmonic contribution to the over-criterion bus by using the data measured at the low-voltage side of the distribution transformer and each feeder line, to obtain the feeder line with the largest harmonic contribution as the feeder line III; then, performing the decentralized evaluation of area harmonic contribution on the feeder line III by using the measurement data of the grid-connected nodes of the key users, and then terminating the local tracing service; finally, uploading the result which as a final result to the edge computing server.

(2) If the marked terminal is located on the distribution line, i.e., the over-criterion harmonic appears in the grid-connected nodes of the key users, the implementation contents of the local tracing service of harmonic sources include: performing the decentralized evaluation of area harmonic contribution on the measuring point where the marked terminal is located by using the measurement data of the terminals deployed on the distribution line where the marked terminal is located, and then terminating the local tracing service and uploading the result to the edge computing server.

The decentralized evaluation of area harmonic contribution, a corresponding implementation scheme thereof is specifically as follows:

taking the measuring point that needs to evaluate harmonic contribution as the starting point, dividing, from the near to the distant, sub-areas layer by layer to the end of each branch through the distribution structure of the measurement terminals on the distribution line the measuring point located on, and gradually refining the harmonic contribution through an inter-level calculation.

(1) Measurement Terminals Screening

Assuming that there are M measurement terminals at the present level and monitoring data of T time nodes, if M>T/2, selecting T/2 measurement terminals according to the severity of harmonic distortion for contribution evaluation. The selection method is to sort, from large to small, probability values of 95% of the total harmonic voltage distortion rate of the M groups of the measuring data in time period T, and select the first T/2 groups of the data, let M=T/2; if M<T/2, all the M measurement terminals participate in the calculation of the contribution evaluation.

(2) Evaluation of Area Harmonic Contribution

Figure 5A:
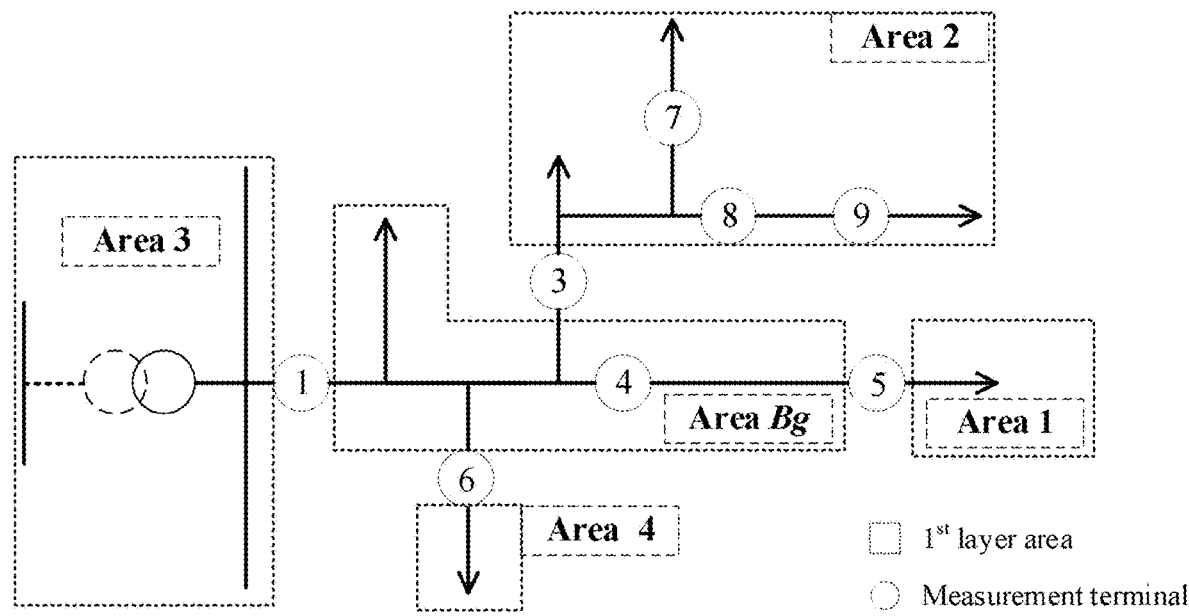
FIG. 5A is a schematic diagram of dividing areas according to Embodiment 2 of the present application.

First layer sub-area: setting the starting point of area division as a PCC point, taking the measurement terminals directly connected with the PCC point as boundary, and preliminarily dividing the branches where the measurement terminals located into harmonic contribution sub-area. Assuming the sub-area containing the PCC point to be background area, and other sub-areas containing branch ends to be equivalent to a single collective harmonic source. As shown in FIG. 5A, taking the No. 4 measurement terminal as the PCC point, and the No. 1, 3, 5, and 6 terminals directly connected to the No. 4 measurement terminal as boundaries, the first layer is divided into four sub-areas.

The relationship between a harmonic voltage at the PCC point and a harmonic current at the first layer sub-area is:

$$V_{PCC-h} = \beta_0 + \beta_1 I_{1-h} + \beta_2 I_{2-h} + \ldots + \beta_N I_{N-h} + \xi \quad (2)$$

Wherein, $V_{PCC-h}$ is the virtual value of the h-times harmonic voltages at the PCC point; $I_{N-h}$ (N≤M) are the virtual values of the h-times harmonic currents at the No. M measurement terminal. The equation (2) can be equivalent to a multivariate linear equation, which can be solved by partial least squares regression, and the coefficient estimation values of amplitudes of each the harmonic current can be obtained by regression, which are respectively $\beta_1, \beta_2, \ldots \beta_N$ and the estimation error $\xi$.

In the adopted partial least squares regression, the independent variable X is the matrix of h-times harmonic currents of each harmonic source, and the dependent variable Y is the matrix of h-times harmonic voltages of the PCC point:

$$X = \begin{pmatrix} I_{1-h}(t_1) & I_{2-h}(t_1) & \ldots & I_{N-h}(t_1) \\ I_{1-h}(t_2) & I_{2-h}(t_2) & \ldots & I_{N-h}(t_2) \\ \vdots & \vdots & \vdots & \vdots \\ I_{1-h}(t_T) & I_{2-h}(t_T) & \ldots & I_{N-h}(t_T) \end{pmatrix} \quad (3)$$

$$Y = (V_{PCC-h}(t_1) \; V_{PCC-h}(t_2) \; \ldots \; V_{PCC-h}(t_T))^T \quad (4)$$

wherein, $V_{PCC-h}(t_T)$ are the virtual values of the h-times harmonic voltages of the PCC point at each sampling time $t_1, t_2, \ldots, t_T$; $I_{N-h}(t_T)$ are the virtual values of the h-times harmonic currents of the No. N measurement terminal at each sampling time $t_1, t_2, \ldots, t_m$.

The harmonic contribution of a downstream sub-area N of a No. N measurement terminal to the PCC point is:

$$H_h^N = \frac{\beta_N I_{N-h}}{V_{PCC-h}} \times 100\% \quad (5)$$

The harmonic contribution of the background area is:

$$H_h^{Bg} = 1 - \sum_{j=1}^{N} H_h^j \quad (6)$$

Completing the evaluation of harmonics contribution of the first layer based on the harmonic voltage and current data of the measurement terminals participating in the division of preset layer sub-area.

Second layer sub-area: checking whether the first layer sub-area contains the measurement terminals selected in (1) to participate in the evaluation of harmonic contribution, if yes, taking the measurement terminal of the present sub-area participate in the division of the first layer as a starting point, and taking the measurement terminals directly connected with the starting point of the present sub-area in the present sub-area as boundaries, and further dividing the branches where the measurement terminals are located into harmonic contribution sub-areas, completing the evaluation of harmonics contribution of the second layer based on the harmonic voltage and current data of the measurement terminals participating in the division of preset layer sub-area; if not, saving the harmonic contribution corresponding to the present sub-area.

Figure 5B:
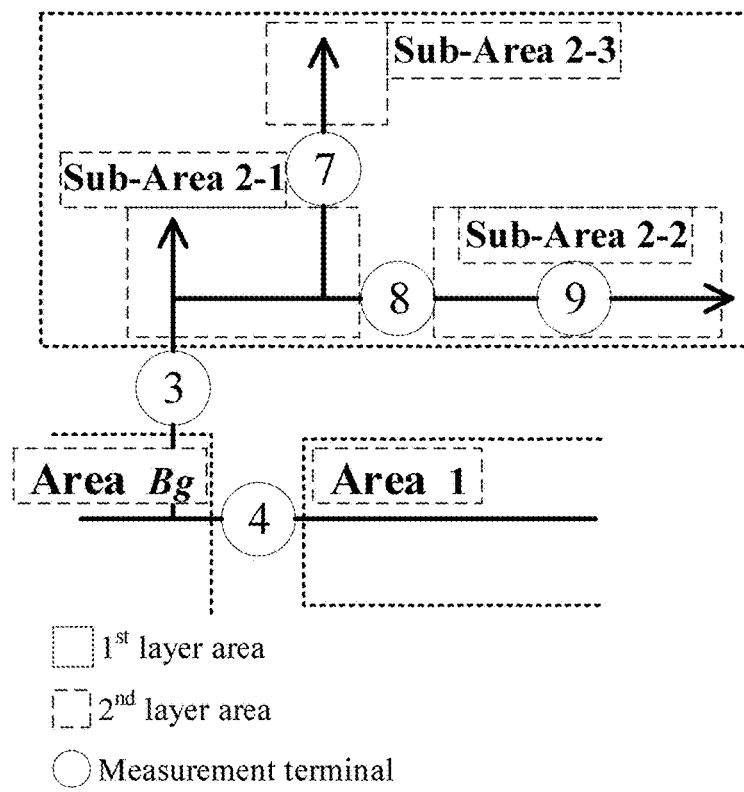
FIG. 5B is a schematic diagram of dividing sub-areas according to Embodiment 2 of the present application.

As shown in FIG. 5B, taking the area 2 as an example, the relationship between the harmonic current at the No. 3 terminal and the harmonic current at the second layer sub-segment is:

$$I_{3-h} = \beta_0 + \beta_7 I_{7-h} + \beta_8 I_{8-h} + \xi \quad (7)$$

wherein, $I_{3-h}, I_{5-h}, I_{6-h}$ are the virtual values of the h-times harmonic currents of No. 3, 7, and 8 measurement terminals respectively. Solving the problem by using the partial least squares regression method, and obtaining the coefficient estimation values of amplitudes of each the harmonic current by regression, which are $\beta_7$, $\beta_8$ and the estimation error $\xi$ respectively.

In the adopted partial least squares regression, the independent variable X is the matrix of h-times harmonic currents of the second layer sub-area, and the dependent variable Y is the matrix of h-times harmonic voltages of the No. 3 terminal:

$$X = \begin{pmatrix} I_{7-h}(t_1) & I_{8-h}(t_1) \\ I_{7-h}(t_2) & I_{8-h}(t_2) \\ \vdots & \vdots \\ I_{7-h}(t_T) & I_{8-h}(t_T) \end{pmatrix} \quad (8)$$

$$Y = (I_{3-h}(t_1) \; I_{3-h}(t_2) \; \ldots \; I_{3-h}(t_T))^T \quad (9)$$

wherein, $I_{3-h}(t_T)$, $I_{7-h}(t_T)$, $I_{8-h}(t_T)$ are virtual values of the h-times harmonic currents of the No. 3, 7 and 8 measurement terminals at each sampling time $t_1$, $t_2$, ..., $t_T$, respectively.

The harmonic contributions of second layer sub-area 2-2 and second layer sub-area 2-3 of the area 2 to PCC point respectively are:

$$H_h^{2-2} = H_h^2 \frac{\beta_7 I_{7-h}}{I_{3-h}} \times 100\% \quad (10)$$

$$H_h^{2-3} = H_h^2 \frac{\beta_8 I_{8-h}}{I_{3-h}} \times 100\% \quad (11)$$

The harmonic contribution for sub-area 2-1 is:

$$H_h^{2-1} = H_h^2 - \left(H_h^{2-2} + H_h^{2-3}\right) \quad (12)$$

Similarly, on the basis of other sub-areas of the first layer, completing the evaluation of harmonic contribution of the second layer based on the harmonic voltage and current data of the measurement terminals participating in the division of the second layer sub-area The third layer and above sub-areas: continuously checking whether there are measurement terminals selected to participate in partition in that sub-area newly divided in the second layer; if yes, repeating the division method of the second layer, and refining the sub-areas towards the branch ends layer by layer until all the measurement terminals selected to participate in partition are taken as the boundaries of the sub-areas, and ending the division. Then, terminating the local tracing service and delivering the harmonic contribution evaluation results of all sub-segments to the edge computing server for storage.

As one or more embodiments, in the step S03, for the request of local tracing service of harmonic sources initiated by the "upload result from the lower-level edge computing server", the content implemented by the edge computing server includes: quantifying the area harmonic contribution for the node where the marked terminal is located, and uploading the quantization result as the final result to the edge computing server.

An implementation scheme of quantifying the area harmonic contribution for the node where the marked terminal is located and the implementation scheme of the decentralized evaluation of area harmonic contribution are consistent.

As shown in FIG. 2, when the edge computing server in the edge cloud I receives the upload result from the low-voltage side of the distribution transformer of the transformer substation with lower voltage, the upload result initiates the request of local tracing service of harmonic sources at the edge computing server. By using measurement data of terminals deployed on a line from the feeder line II to the distribution transformer of the transformer substation with lower voltage, taking a measuring point closest to the high-voltage side of the distribution transformer of the transformer substation with lower voltage as a starting point, performing decentralized evaluation of area harmonic contribution on the point, and then finishing the local tracing service; and finally delivering the result to a storage unit of the edge computing server, wherein the result is a final result.

As one or more embodiments, in the step S04, for the upload result from the edge computing server, the cloud server first determines a type of the result. if that upload result is the quantification result of the area harmonic contribution, the cloud server stores and displays the result visually, and matches main harmonic contribution objects in the area with large harmonic contribution according to the statistical account of the disturbance source; if the upload result is the identification result of the main source, the cloud server stores the result and notifies management personnel to perform other inspection work.

As shown in FIG. 2, when the over-criterion appeared in the low-voltage bus, such as 10 kV, of the transformer substation with higher voltage, such as 110 kV, in the edge cloud I, the edge computing server determines that if the main harmonic source is the upload of the terminal, then the local tracing service is terminated. After the identification result is received by the cloud server, if it is determined as the main source identification result, and is not the final result, then the cloud server notifies the management personnel to perform other inspection work after storing the identification result. The quantification result of area harmonic contribution obtained by executing the local tracing service by the edge computing server and the upload result from the lower-level edge computing server are received and determined as the final results by the cloud server. The cloud server stores the final results and displays the harmonic contribution visually, and matches the main harmonic contribution object in the area with large harmonic contribution according to the statistical account of disturbance source.

As one or more embodiments, in the step S05, the system performs calculation of tracing of the harmonic sources based on measurement data during the observation period. The cloud server offloads the task to the corresponding edge computing server, and the edge computing server decides whether to execute the task locally or continue to offload the task to the local edge computing server. The edge computing server receiving the computing task executes the tracing task, and after reporting layer by layer, the cloud server stores the final tracing result and feeds the execution result back to the system's user.

As shown in FIGS. 2 and 3, when the system's user marks the terminal deployed on the low-voltage side of the distribution transformer in transformer district I at the application layer and specifies the observation period, then: firstly, the cloud server offloads the task to the edge computing server of the edge cloud I; then, the edge computing server decides to continue offloading the task to the edge computing server of the transformer district I; then, the edge computing server of the transformer district I executes the tracing task according to the step S02, feeds the tracing result back to the edge computing server, and the edge computing server feeds the result back to the cloud server; and finally, the cloud server stores the final tracing result and feeds the execution result back to the system's user.

In the present embodiment, the harmonic measurement terminals are deployed on power distribution equipment and medium/low-voltage distribution network lines in transformer substations and transformer districts, the edge computing servers are deployed in transformer substations and transformer districts by units, each the edge computing server is controlled downward step by step according to voltage level, and the cloud servers of the system for tracing harmonic sources are deployed in centralized computer rooms such as data centers; according to the voltage level and power grid operation, the corresponding service scheme shall be implemented, and the tracing of the harmonic sources shall be completed near the terminal through hierarchical tracing interaction of the edge computing environment, so as to realize the location and contribution evaluation of the harmonic sources based on cloud-edge-terminal collaboration.

According to the embodiments above, locating the area where the dominant disturbance source of the harmonic located in, quantifying the harmonic contribution of the system background and each user to the concerned buses/nodes, directly finding the pollution source, providing a basis for subsequent targeted treatment of the dominant disturbance source, and fundamentally solving the disturbance; further can check erroneous ideas at the outset, which is helpful to reduce the occurrence risk and harm of the power quality problem, and improve the high-quality power supply level of the power distribution system. Furthermore, corresponding execution contents may include, but are not limited to: (1) installing active/passive filters; (2) switching static reactive power compensators, such as capacitors; and (3) installing dynamic reactive power compensators, such as a SVG, in the area where the dominant disturbance source of the harmonic located in.

Embodiment III

The present embodiment provides a computer-readable storage medium.

The computer-readable storage medium is non-transitory and stores a program thereon, and when the program executed by a processor, implements the steps of the method of tracing harmonic sources based on cloud-edge-terminal collaboration according to the Embodiment II of the present application.

The detailed embodiments are the same as those of the method of tracing harmonic sources based on cloud-edge-terminal collaboration according to the Embodiment II, and are not repeated here.

Embodiment IV

The present embodiment provides an electronic device.

The electronic device comprises a memory, a processor and a program stored in the memory and operable on the processor, and when the program executed by the processor, implements the steps of the method of tracing harmonic sources based on cloud-edge-terminal collaboration according to the Embodiment II of the present application.

The detailed embodiments are the same as those of the method of tracing harmonic sources based on cloud-edge-terminal collaboration according to the Embodiment II, and are not repeated here.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A system for tracing harmonic sources based on cloud-edge-terminal collaboration, comprising:
   a terminal module, being configured to collect real-time harmonic data for reflecting an actual operation situation of a power grid and transmit the collected real-time harmonic data to an edge module;
   the edge module, being configured to comprise a plurality of edge computing servers of edge cloud, wherein the plurality of the edge computing servers are deployed for transformer substations and transformer districts by units, realize a hierarchical control between the plurality of the edge computing servers according to voltage levels, and transmit a tracing task of harmonic sources through hierarchical interactions between the plurality of the edge computing servers; wherein, one of the plurality of the edge computing servers receiving a request of tracing service of harmonic sources performs the tracing task of harmonic sources, and feed a tracing result of harmonic sources back to a central module; and
   the central module, being configured to comprise a cloud server for controlling the system for tracing harmonic sources, wherein the cloud server receives the request of tracing service of harmonic sources initiated by a user of the system, determines one of the plurality of the edge computing servers offloaded by the request of tracing service of harmonic sources, stores a final tracing result from entire the system for tracing harmonic sources, and matches a typical harmonic source according to a disturbance source information.

2. The system for tracing harmonic sources based on the cloud-edge-terminal cooperation according to claim 1, wherein the terminal module comprises harmonic measurement terminals, and each of the harmonic measurement terminals is arranged at a low-voltage side and a feeder line of distribution transformer of the transformer substations, a low-voltage side and a feeder line of distribution transformer of the transformer districts, and a grid-connected node of a key user of a medium/low voltage distribution network.

3. The system for tracing harmonic sources based on the cloud-edge-terminal collaboration according to claim 1, wherein the edge module stores upload data transmitted by the terminal module, checks a harmonic distortion situation in terminals under a jurisdiction thereof simultaneously, observes and marks the terminal of which the harmonic distortion situation exceeds a specified threshold, and initiates a request of local tracing service of harmonic sources through an "terminal marked event"; wherein, when the edge computing server at a higher level receives an upload result from the edge computing server at a lower level, the request of the local tracing service of harmonic sources is initiated based on the upload result, and an execution result of the request is delivered to the edge computing server; and a download task of the central module is offloaded through the edge computing servers, and performance of executing locally or continue offloading to a local edge computing server can be determined by the edge computing server.

4. The system for tracing harmonic sources based on the cloud-edge-terminal collaboration according to claim 1, wherein the plurality of the edge computing servers comprise centralized edge computing servers and local edge computing servers; wherein, the centralized edge computing servers centrally control entire the edge cloud computing network; and the local edge computing servers are controlled step by step according to the voltage levels, and are responsible for terminal jurisdiction and tracing decisions within a local range.

5. The system for tracing harmonic sources based on the cloud-edge-terminal collaboration according to claim 1, wherein the central module stores the tracing result of the system for tracing harmonic sources, and matches a harmonic source according to the results from the cloud servers; further, controls all the edge computing servers, when the request of tracing service is initiated, decides one of the edge computing servers which to a computing task being offloaded to, and feeds the tracing result of harmonic sources back to the cloud servers and the terminal module.

6. A method of tracing harmonic sources based on the cloud-edge-terminal collaboration, based on system for tracing harmonic sources based on cloud-edge-terminal collaboration according to claim 1, the method comprising:

acquiring, by harmonic measurement terminals, real-time harmonic data of power grid operation, and uploading the acquired real-time harmonic data to a docking managed edge computing server;

determining, by the docking managed edge computing server, whether to initiate the request of tracing service of harmonic sources locally based on the acquired real-time harmonic data;

when the request of local tracing service of harmonic sources is initiated by the docking managed edge computing server, performing a corresponding tracing task of harmonic sources according to different over-criterion situations of harmonics, transmitting the corresponding tracing task of harmonic sources through hierarchical interactions between edge computing servers, and finally feeding the tracing result of harmonic sources back to the cloud server, to complete the tracing of harmonic sources based on the cloud-edge-terminal collaboration; and when the cloud server receiving the request of local tracing service of harmonic sources is initiated by the user of the system, determining one edge computing server unloaded by the request of tracing service of harmonic sources; executing, by the edge computing server receiving the request of tracing service of harmonic sources, the tracing task of harmonic sources, feeding the tracing result of harmonic sources back to the cloud server, to complete the tracing of harmonic sources based on the cloud-edge-terminal collaboration;

wherein, implementing corresponding service schemes according to the voltage levels and power grid operation, and completing the tracing of the harmonic sources near the terminals through a hierarchical interaction of edge computing environment, as to realize the location and contribution evaluation of the harmonic sources based on cloud-edge-terminal collaboration; wherein, after matching, by the cloud server, a main harmonic contribution object in an area with large harmonic contribution, performing, in areas where a dominant disturbance source of the harmonic located in, (i) installation of active/passive filters, (ii) switching of static reactive power compensators, such as capacitors, or (iii) installation of dynamic reactive power compensators, such as a Static Var Generator (SVG).

7. The method of tracing harmonic sources based on the cloud-edge-terminal collaboration according to claim 6, wherein in the process of the determining, by the edge computing server, whether to initiate the request of tracing service of harmonic sources locally based on the acquired real-time harmonic data, when there is an over-criterion harmonic appears in a single terminal, the edge computing server initiates an observation request, marks the terminal the over-criterion harmonic appears, and observes an over-criterion situation of harmonic of the marked terminal within a specified time period; wherein, if a proportion of duration during which the voltage distortion rate of the marked terminal in the observation time period exceeds a prescribed threshold value, the edge computing server initiates the request of local tracing service of harmonic sources, otherwise, the mark of the marked terminal is cancelled; all tracing tasks of the system are executed based on the calculation of the harmonic measurement data in the observation time period; and in the process of the initiating, by the edge computing server, the request of local tracing service of harmonic sources to perform the corresponding tracing task of harmonic sources according to different over-criterion situations of harmonics, when the edge computing server at the higher level receives the upload result from the edge computing server at the lower level, the edge computing server initiates the request of local tracing service of harmonic sources based on the upload result; and, based on the download task of the central module is offloaded through the edge computing servers, and the edge computing server determines whether to execute the request of tracing service of harmonic sources locally or to continue offloading the download task to the local edge computing servers.

8. A computer-readable storage medium is non-transitory and stores a program thereon, and when the program executed by a processor, implements the steps of the method of tracing harmonic sources based on the cloud-edge-terminal collaboration according to claim 7.

9. An electronic device, comprising a memory, a processor and a program stored in the memory and operable on the processor, and when the program executed by the processor, implements the steps of the method of tracing harmonic sources based on the cloud-edge-terminal collaboration according to claim 7.

10. The method of tracing harmonic sources based on the cloud-edge-terminal collaboration according to claim 6, wherein the method for tracing harmonic sources further comprises a evaluation of area harmonic contributions, the evaluation of area harmonic contributions comprising: taking a monitoring point of the harmonic contributions to be divided as a starting point, dividing each sub-area layer by layer through a distribution structure of the harmonic measurement terminals in the distribution lines wherein those harmonic measurement terminals are located, and gradually refining the harmonic contributions through the hierarchical relationship of the edge computing servers.

11. A computer-readable storage medium is non-transitory and stores a program thereon, and when the program executed by a processor, implements the steps of the method of tracing harmonic sources based on the cloud-edge-terminal collaboration according to claim 10.

12. An electronic device, comprising a memory, a processor and a program stored in the memory and operable on the processor, and when the program executed by the processor, implements the steps of the method of tracing harmonic sources based on the cloud-edge-terminal collaboration according to claim 10.

13. A computer-readable storage medium is non-transitory and stores a program thereon, and when the program executed by a processor, implements the steps of the method of tracing harmonic sources based on the cloud-edge-terminal collaboration according to claim 6.

14. An electronic device, comprising a memory, a processor and a program stored in the memory and operable on the processor, and when the program executed by the processor, implements the steps of the method of tracing harmonic sources based on the cloud-edge-terminal collaboration according to claim 6.

* * * * *